United States Patent [19]

Taoda et al.

[11] Patent Number: 4,473,484

[45] Date of Patent: Sep. 25, 1984

[54] MATERIAL FOR CONVERSION OF SOLAR ENERGY

[75] Inventors: Hiroshi Taoda, Nagoya; Kiyoshi Hayakawa, Gifu; Kaoru Kawase; Takaari Yumoto, both of Nagoya; Mineo Kosaka, Tsushima; Tadashi Asahina, Nagoya, all of Japan

[73] Assignees: Agency of Industrial Science & Technology; Ministry of International Trade & Industry, both of Tokyo, Japan

[21] Appl. No.: 517,955

[22] Filed: Jul. 28, 1983

[30] Foreign Application Priority Data

Aug. 10, 1982 [JP]  Japan .................................. 57-139071

[51] Int. Cl.$^3$ ............................................... C09K 5/00

[52] U.S. Cl. ...................................... 252/70; 126/452; 126/900

[58] Field of Search ................... 252/70; 126/452, 900

[56] References Cited

U.S. PATENT DOCUMENTS 4,004,571  1/1977  Schwerzel et al. ................. 126/270
4,424,805  1/1984  Neary .................................... 126/452

*Primary Examiner*—John E. Kittle
*Assistant Examiner*—Robert A. Wax
*Attorney, Agent, or Firm*—Oblon, Fisher, Spivak, McClelland & Maier

[57] ABSTRACT

A material comprising an organic compound capable of inducing its own photo-isomerization, a photosensitizer, and a side-reaction inhibitor exhibits an ability to convert solar energy into another form of energy and store it in such form.

9 Claims, 1 Drawing Figure

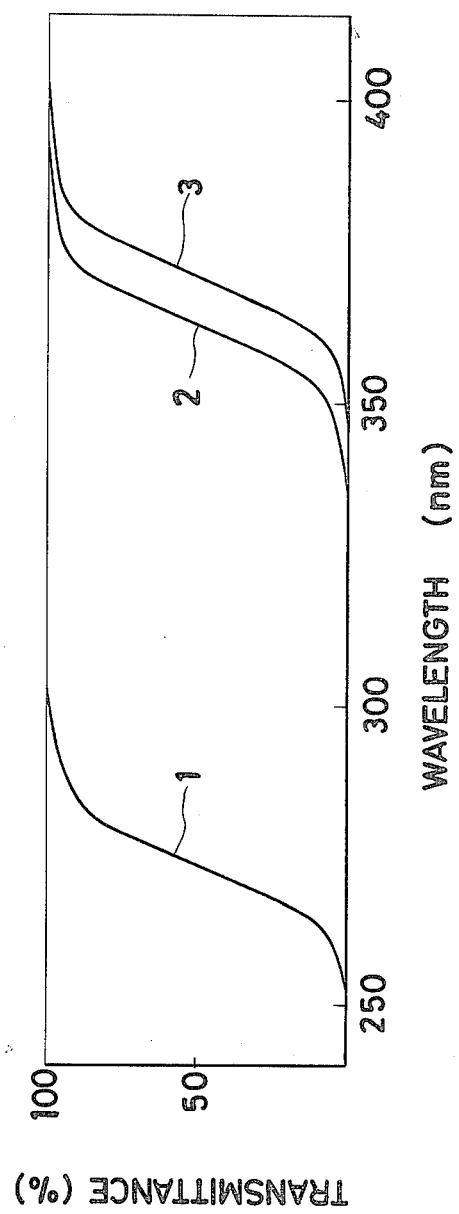

MATERIAL FOR CONVERSION OF SOLAR ENERGY

BACKGROUND OF THE INVENTION:

This invention relates to a material capable of storing solar energy as converted into another form of energy, and more particularly to a material which permits storage of solar energy in a converted form therein and release of the stored energy therefrom to be repeated cyclically over a long period and which otherwise permits the solar energy once stored therein as converted into another form of energy to be preserved therein for a long period and, therefore, serves advantageously as a safe storage vessel for a solar system.

As devices currently available for the conversion of solar energy into other forms of energy, there may be cited selective absorption membranes intended for use in solar heat collectors, and solar cells. The absorption membranes convert solar energy into heat and the solar cells convert it into electricity respectively. The heat and electricity produced by these devices can utilize solar energy only in the daytime during which the devices are exposed to the sunlight. For the heat and electricity to be utilized during the night time or on rainy days, the devices require additional expensive vessels for the storage of heat and electricity. Where solar energy, which is abundantly available in the summer, is desired to be harnessed and utilized for space heating and other similar purposes in the winter, these devices call for additional installation of voluminous and expensive facilities for the storage of heat and electricity. When the heat and electricity are to be preserved in such large vessels for a long time, however, these vessels inevitably suffer from considerable loss of such energies due to leakage.

There are various organic compounds which are capable of inducing their own photo-isomerization. A typical example of these organic compounds is norbornadiene which, on absorbing light, undergoes isomerization into quadricyclene. This compound is widely known to be capable of storing as much as 240 cal of energy per g owing to this photo-isomerization. Quadricyclene is a highly stable substance which undergoes hardly any reverse reaction at room temperature and exhibits a half life of as long as 14 hours when it is heated at 140° C. This substance, when silver or a rhodium complex is added thereto, immediately undergoes a reverse reaction and converts itself with evolution of heat back to norbornadiene. The heat liberated during this reverse reaction can be utilized for space heating, for example. Mere preservation of quadricyclene at room temperature, therefore, warrants protracted storage of energy. In this preservation there is no need for an expensive, thoroughly insulated vessel as is used for storing energy in the form of hot water.

Norbornadiene, however, has a disadvantage that it absorbs only ultraviolet light and, therefore, induces virtually no photo-isomerization of its own but entails a side-reaction of the nature of polymerization under sunlight. Even if it is made somehow or other to induce its own photo-isomerization upon exposure to sunlight and if the side-reaction gives rise to a by-product in an amount of 1% based on the amount of norbornadiene, for example, then the amount of the by-product will cumulatively increase and reach 63% after the storage of solar energy and release of the stored energy are repeated a total of 100 cycles. Thus, this substance fails to provide a long service life.

Organic compounds which induce their own photo-isomerization have been described with respect to norbornadiene as a typical example. Generally these organic compounds, when exposed to light, absorb only specific portions of the light spectrum and, more frequently than not, entail side-reactions. Adoption of these organic compounds as media for the conversion of solar energy into other forms of energy, therefore, entails problems yet to be solved.

This invention is aimed at providing a material useful for the utilization of solar energy by making use of such an organic compound as is capable of inducing its own photo-isomerization.

SUMMARY OF THE INVENTION

The inventors made a diligent study in search of a method for enabling any of the organic compounds which, like norbornadiene, induce their own photo-isomerization to be used for prolonged storage of solar energy or for protracted cyclic use of stored solar energy. They have consequently ascertained that when an organic compound capable of inducing its own photo-isomerization is combined with a photo-sensitizer such as benzophenone and a side-reaction inhibitor such as phenol, the produced composition undergoes photo-isomerization even under light of long wavelength to the extent of enhancing the efficiency of solar energy utilization and without entailing any side-reaction and it can be used for prolonged storage of solar energy and for protracted cyclic use of solar energy.

This knowledge has led to perfection of the present invention. To be specific, this invention relates to a material for the conversion of solar energy into another form of energy, which material is obtained by combining an organic compound capable of inducing its own photo-isomerization, a photo-sensitizer, and a side-reaction inhibitor, or by combining the said components and dissolving the resultant composition in a solvent.

BRIEF DESCRIPTION OF THE DRAWING

The drawing is a graph showing the relation between the wavelength of incident light and the transmittance (%) of the material to the light; in the graph, the curve (1) represents the data obtained of the material using norbornadiene, the curve (2) those obtained of the material using the solution of this invention indicated in Example 1, and the curve (3) those obtained of the material using the solution of this invention indicated in Example 2, respectively.

DESCRIPTION OF PREFERRED EMBODIMENTS

The organic compound used in the present invention for inducing its own photo-isomerization is an organic compound which can convert light energy into a chemical energy, namely, an organic compound which, on absorbing light energy, converts itself into a relatively stable isomer such that the isomer, on being exposed to a catalyst or to heat, reverts to the former compound with liberation of the absorbed energy. Examples of organic compounds which meet this description include norbornadiene, azobenzene, anthracene, naphthalene, naphthalenediphenylacetylene adduct, cyclopentadiene, cyclooctadiene, pyridone, pyrazoline, nitron, prismane, azepin, cubane, dicyclopentadien-1-one, benzene and derivatives thereof.

The role of the photo-sensitizer used in this invention is to absorb light energy and passes it on to the organic compound destined to undergo photo-isomerization. Owing to the effect of this substance, the photo-isomerization can be caused even under light of a long wavelength and, consequently, the efficiency of solar energy utilization can be enhanced.

Examples of photo-sensitizers which can provide this function include aromatic compounds having carbonyl groups such as acetophenone, benzophenone, thioxanthone, anthraquinone, flavone, 4-acetylbiphenyl, 1-naphthyl phenyl ketone, 2-naphthyl phenyl ketone, 2-naphthoaldehyde, 2-acetonaphthone, o-benzyloxybenzaldehyde diacetyl, benzyl, and fluorenone, aliphatic carbonyl compounds such as acetone, methyl ethyl ketone, aromatic compounds such as triphenylene, toluene, naphthalene, and anthracene, derivatives of these compounds, and metal salts represented by monovalent copper salts such as copper (I) chloride. The material of the present invention must contain at least one member selected from the group of photo-sensitive compounds enumerated above.

The side-reaction inhibitor to be used in the present invention is a substance which prevents the photo-isomerization from entailing any side-reaction and, consequently, ensures the storage and release of solar energy to be repeated cyclically over a long time. Owing to this effect of the side-reaction inhibitor, the cost per cycle of the storage and release of solar energy can be lowered.

Examples of side-reaction inhibitors which fulfill this requirement include cresol and cresol derivatives such as tert-butyl-m-cresol; phenol and phenol derivatives such as aminophenol; hydroquinone and hydroquinone derivatives such as 2,5-di-tert-butyl hydroquinone; catechol and catechol derivatives such as p-tert-butyl catechol; anisole and anisole derivatives such as butylhydroxy anisole; N-nitrosoaniline and N-nitrosoaniline derivatives such as N-nitrosophenylhydroxyl amine; alkyl nitrites such as n-butyl nitrite; and xylenols such as o-xylenol, m-xylenol, and p-xylenol, and derivatives thereof. At least one member selected from the group of side-reaction inhibitors enumerated above is used in the material of this invention.

The material which is obtained by combining the organic compound capable of inducing its own photo-isomerization, the photo-sensitizer, and the side-reaction inhibitor described above, and dissolving the resultant composition in a suitable solvent is also embraced by the present invention.

The solvent used in dissolving the composition is required to be incapable of reacting upon the organic compound. In other words, it is required to be stable so that it will not undergo decomposition or other similar reaction when exposed to light.

Examples of solvents satisfying this requirement include saturated aliphatic compounds such as cyclopentane, cyclohexane, cycloheptane, n-pentane, n-hexane, and n-heptane; halogen compounds such as chloroform and methylene chloride; aromatic compounds such as toluene and benzene; halogenated derivatives of such aromatic compounds; and nitrile compounds such as acetonitrile.

In the various examples of the components for the material of this invention which have been cited above, preferred examples of the organic compound are norbornadiene, azobenzene, dicyclopentadiene, and cyclooctadiene; preferred examples of the photo-sensitizer are alkylarylketones such as acetophenone, benzophenone, and 4-(N,N-dimethylamino)-benzophenone, and preferred examples of the side-reaction inhibitor are phenols such as phenol, cresol, p-hydroxyanisole, 3-tert-butyl-4-hydroxyanisole, 2,5-di-tert-butylhydroquinone, methyl p-hydroxybenzoate, ethyl p-hydroxybenzoate, propyl p-hydroxybenzoate, 2-tert-butylhydroquinone, and 2,6-di-tert-butyl-p-cresol; n-butyl nitrite; and nitroso compounds such as ammonium salt of N-nitrosophenylhydroxylamine, N-methyl-N-nitrosoaniline and aluminum N-nitrosophenylhydroxylamine.

Now, the proportions in which the components for the material of this invention are to be used will be described. Generally, the photo-sensitizer and the side-reaction inhibitor may be effectively used in their respective catalytic amounts relative to the organic compound which is required to undergo photo-isomerization. Specifically, their amounts are between the maximum of 15 mol % and the minimum of $10^{-3}$ mol %. The reason for this range is that beyond the upper limit, the photo-sensitizer and the side-reaction inhibitor undergo notable decomposition and, thus, fail to make their use in the material practicable. Toluene, acetone, and other similar compounds which function concurrently as photo-sensitizer and solvent are exemplified from this limitation. Below the lower limit, the photo-sensitizer absorbs solar energy insufficiently and the side-reaction inhibitor provides insufficient inhibition of side-reaction.

The material of this invention is generally produced by adding a photo-sensitizer and a side-reaction inhibitor at a room temperature under normal pressure in the air to an organic compound destined to undergo photo-isomerization or a solution of the organic compound and dissolving them by stirring. The mixture may be heated to the level of about 40° C. for the purpose of accelerating its dissolution. When the organic compound is to be dissolved in a solvent, the amount of the organic compound relative to the solvent is from 10% by weight to the concentration in which the solvent is saturated with the organic compound.

The material for the conversion of solar energy thus obtained enables the zone of absorption of light to be expanded to a longer wavelength and enhances the efficiency of solar energy utilization and avoids giving rise to any by-product such as polymer as compared with the organic compound which is used solely for the purpose of photo-isomerization. Thus, the material of this invention for the conversion of solar energy is capable of simultaneously collecting and storing solar energy and permitting prolonged storage of energy. Since it enables the storage and release of solar energy to be repeated cyclically, it proves highly advantageous for the utilization of solar energy.

Naturally, this material is allowed to incorporate therein, in addition to the organic compound destined to undergo photo-isomerization, the photo-sensitizer, and the side-reaction inhibitor which are indispensable components therefor, some other substances in amounts not so large as to affect substantially the quantity of the finally produced material for the conversion of solar energy.

Now, the present invention will be described more specifically below with reference to working examples.

EXAMPLE 1

In 100 ml of cyclohexane, 4.61 g (0.05 mole) of norbornadiene was dissolved at a room temperature under normal pressure in the air. In the resultant solution, 0.06 g ($5 \times 10^{-4}$ mole) of acetophenone and 0.05 g ($5 \times 10^{-4}$ mole) of phenol were dissolved by agitation.

The transmittance of this solution is shown by the curve (2) in the accompanying drawing. The curve (1) represents the transmittance exhibited by the material prepared solely of norbornadiene as indicated below in Comparative Experiment. Comparison of these two curves reveals that the solution enabled the zone of light absorption to be expanded in the direction of increasing wavelength by about 100 nm and was capable of absorbing light up to a wavelength of 370 nm. This solution was placed in a conical flask of an inner volume of 500 ml and, with the flask tightly stoppered, exposed to sunlight for eight hours. At the end of this exposure, the solution was found to have formed 0.84 g of quadricyclene. When 0.04 g of a rhodium complex, $Rh_2(CO)_4Cl_2$ was added thereto, there ensued liberation of 201 cal of heat. When the mixture was filtered to remove the rhodium complex and the resultant filtrate was subjected to the same treatment, substantially no by-product was found.

EXAMPLE 2

In 100 ml of cyclohexane, 3.69 g (0.04 mole) of norbornadiene was dissolved at a room temperature under normal pressure in the air. In the resultant solution, 72.8 mg ($4 \times 10^{-4}$ mole) of benzophenone and 48.8 mg ($4 \times 10^{-4}$ mole) of o-xylenol were dissolved by agitation. The transmittance of this solution is shown by the curve (3) in the accompanying drawing. From this curve, it is noted that this solution exhibited absorption of light up to 380 nm.

This solution was placed in a conical flask of an inner volume of 500 ml and, with the flask tightly stoppered, exposed to sunlight for 10 hours. At the end of this exposure, the solution was found to have produced 1.09 g of quadricyclene. When 0.05 g of a rhodium complex, $Rh_2(CO)_4Cl_2$, was added thereto, there ensued liberation of 261 cal of heat. When the mixture was filtered to separate off the rhodium complex and the resultant filtrate was subjected to the same treatment, substantially no secondary product was found.

COMPARATIVE EXPERIMENT

At room temperature, under normal pressure in the air, 4.61 g (0.05 mole) of norbornadiene was dissolved in 100 ml of cyclohexane. The transmittance of this solution is shown by the curve (1) in the accompanying drawing. When this solution was placed in a conical flask of an inner volume of 500 ml and, with the flask tightly stoppered, exposed to sunlight for 10 hours, the solution was found to have formed 0.9 g of a by-product. No formation of quadricyclene was found in the solution.

EXAMPLE 3

In 100 ml of cyclohexane, 9.1 g (0.05 mole) of trans-azobenzene was dissolved at room temperature under normal pressure in the air. In the resultant solution, 91.0 mg ($5 \times 10^{-4}$ mole) of benzophenone and 47 mg ($5 \times 10^{-4}$ mole) of phenol were dissolved by agitation. When this solution was placed in a conical flask of an inner volume of 500 ml and exposed to sunlight for six hours, it was found to have produced 3.4 g of cis-azobenzene. When 0.1 g of cobalt porphyrin was added to this solution, there ensued libration of 218 cal of heat. When the mixture was filtered to separate off the cobalt porphyrin and the resultant filtrate was subjected to the same treatment, no formation of any by-product was observed.

EXAMPLE 4

In 10 ml of chloroform, 0.10 g (0.001 mole) of cubane was dissolved at a room temperature under normal pressure in the air. In the resultant solution, 0.01 g ($8 \times 10^{-5}$ mole) of acetophenone and 0.01 g ($1.1 \times 10^{-4}$ mole) of phenol were dissolved by agitation. This solution was placed in a quartz glass tube 1 mm in diameter in nitrogen atmosphere, exposed to sunlight for six hours. When the resultant solution was combined with 0.01 g of a rhodium complex, $Rh_2(CO)_4Cl_2$, and heated to 160° C., there ensued liberation of 4.6 cal of heat. When the mixture was filtered to separate off the rhodium complex and the resultant filtrate was subjected to the same treatment, no formation of any by-product was observed.

EXAMPLES 5-14

By following the procedure of Example 4, various compounds were tried for the reaction. The reaction conditions involved and the results of the reaction were as shown in Table 1.

After repeated treatments, none of the produced materials were observed to have formed any by-product.

TABLE 1

| Example | Compound | Sensitizer | Side-reaction inhibitor | Solvent | Exposure time | Catalyst for reverse reaction | Temperature | Amount of heat liberated |
|---|---|---|---|---|---|---|---|---|
| 5 | anthracene, 0.5 g | toluene, 10 ml | o-xylenol, 0.05 g | — | 6 hr | | 210° C. | 10.2 cal |
| 6 | 2-methoxynaphthalene, 0.02 g | toluene, 10 ml | p-hydroxyanisole 0.001 g | — | 12 hr | | 170° C. | 5.1 cal |
| 7 | naphthalene-diphenyl-acetylene adduct, 0.1 g | benzophenone, 0.02 g | catechol, 0.01 g | benzene, 10 ml | 6 hr | | 200° C. | 7.5 cal |
| 8 | dicyclopentadien-1-one, 0.5 g | anthracene, 0.08 g | phenol, 0.03 g | chloroform, 10 ml | 6 hr | $Rh(PPh_3)_3Cl$ | 160° C. | 12.5 cal |
| 9 | hexamethyl prismane, 0.1 g | acetophenone, 0.01 g | 2,6-di-tert-butyl-p-cresol, 0.01 g | chloroform, 10 ml | 6 hr | $Rh_2(CO)_4Cl_2$ | 160° C. | 4.8 cal |
| 10 | 1-methyl-5-phenyl pyrazoline, 0.1 g | benzophenone, 0.01 g | ammonium N—nitrosophenyl hydroxyl amine, 0.01 g | cyclohexane, 10 ml | 6 hr | | 200° C. | 4.5 cal |
| 11 | ethoxycarbonyl-1-H—azepin, 0.1 g | acetophenone, 0.01 g | 2,6-di-tert-butyl-p-cresol, 0.01 g | cyclohexane, 10 ml | 24 hr | | 140° C. | 2.4 cal |
| 12 | hexa-(pentafluoroethyl)-benzene, 0.1 g | benzophenone, 0.01 g | phenol, 0.01 g | cyclohexane, 10 ml | 8 hr | | 200° C. | 8.1 cal |

TABLE 1-continued

| Example | Compound | Sensitizer | Side-reaction inhibitor | Solvent | Exposure time | Catalyst for reverse reaction | Temperature | Amount of heat liberated |
|---|---|---|---|---|---|---|---|---|
| 13 | 1,5-cyclooctadiene, 0.1 g | acetone, 10 ml | 2,6-di-tert-butyl-p-cresol, 0.01 g | | 12 hr | | 160° C. | 8.5 cal |
| 14 | norbornadiene, 0.1 g | CuCl, 0.01 g | 2,6-di-tert-butyl-p-cresol, 0.02 g | cyclohexane, 10 ml | 6 hr | $Rh_2(CO)_4Cl_2$ | 25° C. | 12.1 cal |

What is claimed is:

1. A material for storing solar energy as converted into another form of energy, which comprises an organic compound capable of inducing its own photo-isomerization, a photo-sensitizer, and a side-reaction inhibitor.

2. A material according to claim 1, wherein said organic compound capable of inducing its own photo-isomerization is at least one member selected from the group consisting of norbornadiene, azobenzene, anthracene, naphthalene, naphthalene-diphenylacetylene adduct, cyclopentadiene, cyclooctadiene, pyridone, pyrazoline, nitron, prismane, azepin, cubane, dicyclopentadien-1-one, benzene, and derivatives thereof.

3. A material according to claim 1, wherein said photo-sensitizer is at least one member selected from the group consisting of aromatic compounds having carbonyl groups such as acetophenone, benzophenone, thioxanthone, anthraquinone, flavone, acetylbiphenyl, naphthyl phenyl ketone, naphthoaldehyde, acetonaphthone, o-benzyloxy-benzaldehyde, diacetyl, benzyl, and fluorenone, aliphatic carbonyl compounds such as acetone, methyl ethyl ketone, aromatic compounds such as triphenylene, toluene, naphthalene, and anthracene, derivatives of these compounds and metal salts such as CuCl.

4. A material according to claim 1, wherein said side-reaction inhibitor is at least one member selected from the group consisting of cresol and cresol derivatives such as tert-butyl-m-cresol; phenol and phenol derivatives such as aminophenol; hydroquinone and hydroquinone derivatives such as 2,5-di-tert-butyl hydroquinone; catechol and catechol derivatives such as p-tert-butyl catechol; anisole and anisole derivatives such as butylhydroxy anisole; N-nitrosoaniline and N-nitrosoaniline derivatives such as N-nitrosophenylhydroxyl amine; alkyl nitrites such as n-butyl nitrite; and xylenols such as o-xylenol, m-xylenol, and p-xylenol, and derivatives thereof.

5. A material for converting solar energy to another form of energy and storing solar energy, which is obtained by dissolving an organic compound capable of inducing its own photo-isomerization in a solvent and adding a photo-sensitizer and a side-reaction inhibitor to the resultant solution.

6. A material according to claim 5, wherein said organic compound capable of inducing its own photo-isomerization is at least one member selected from the group consisting of norbornadiene, azobenzene, anthracene, naphthalene, naphthalene-diphenylacetylene adduct, cyclopentadiene, cyclooctadiene, pyridone, pyrazoline, nitron, prismane, azepin, cubane, dicyclopentadien-1-one, benzene, and derivatives thereof.

7. A material according to claim 5, wherein said photosensitizer is at least one member selected from the group consisting of aromatic compounds having carbonyl groups such as acetophenone, benzophenone, thioxanthone, anthraquinone, flavone, acetylbiphenyl, naphthyl phenyl ketone, naphthoaldehyde, acetonaphthone, o-benzyloxy-benzaldehyde, diacetyl, benzyl, and fluorenone, aliphatic carbonyl compounds such as acetone, methyl ethyl ketone, aromatic compounds such as triphenylene, toluene, naphthalene, and anthracene, derivatives of these compounds and metal salts such as CuCl.

8. A material according to claim 5, wherein said side-reaction inhibitor is at least one member selected from the group consisting of cresol and cresol derivatives such as tert-butyl-m-cresol; phenol and phenol derivatives such as aminophenol; hydroquinone and hydroquinone derivatives such as 2,5-di-tert-butyl hydroquinone; catechol and catechol derivatives such as p-tert-butyl catechol; anisole and anisole derivatives such as butylhydroxy anisole; N-nitrosoaniline and N-nitrosoaniline derivatives such as N-nitrosophenylhydroxyl amine; alkyl nitrites such as n-butyl nitrite; and xylenols such as o-xylenol, m-xylenol, and p-xylenol, and derivatives thereof.

9. A material according to claim 5, wherein said solvent is at least one member selected from the group consisting of saturated aliphatic compounds such as cyclopentane, cyclohexane, cycloheptane, n-pentane, n-hexane, and n-heptane, halogen compounds such as chloroform and methylene chloride, aromatic compounds such as toluene, and benzene, halogenated derivatives of such aromatic compound, and nitrile compounds such as acetonitrile.

* * * * *